United States Patent [19]

Cipelletti

[11] Patent Number: 4,655,605

[45] Date of Patent: Apr. 7, 1987

[54] ICE-CREAM MACHINE

[75] Inventor: Alberto Cipelletti, Guardamiglio, Italy

[73] Assignee: Ditta Cipelletti Alberto, Italy

[21] Appl. No.: 708,244

[22] Filed: Mar. 5, 1985

[30] Foreign Application Priority Data

Mar. 6, 1984 [IT] Italy .................................... 21119[U]

[51] Int. Cl.$^4$ .......................... B01F 7/18; B01F 15/06
[52] U.S. Cl. ..................................... 366/312; 62/354; 366/149
[58] Field of Search ............... 366/314, 309, 310, 311, 366/312, 313, 144, 147, 148, 149; 62/354

[56] References Cited

U.S. PATENT DOCUMENTS

| 2,575,374 | 11/1951 | Walsh | 62/354 |
| 3,848,289 | 11/1974 | Bachmann | 62/354 |
| 3,921,961 | 11/1975 | Hapgood | 366/309 |

Primary Examiner—Robert W. Jenkins
Attorney, Agent, or Firm—Lerner, David, Littenberg, Krumholz & Mentlik

[57] ABSTRACT

The invention relates to an ice-cream machine for family use, comprising a whipping vessel wherein a stirring element is rotatively actuated by a motor, said stirring element comprising a sleeve and one or more blades. In order to improve the stirring operational features, at least one blade is mounted on the sleeve by means of a removable coupling allowing both small torsional and axial motions of the blade with reference to an axis perpendicular to the sleeve axis.

3 Claims, 4 Drawing Figures

U.S. Patent
Apr. 7, 1987
4,655,605
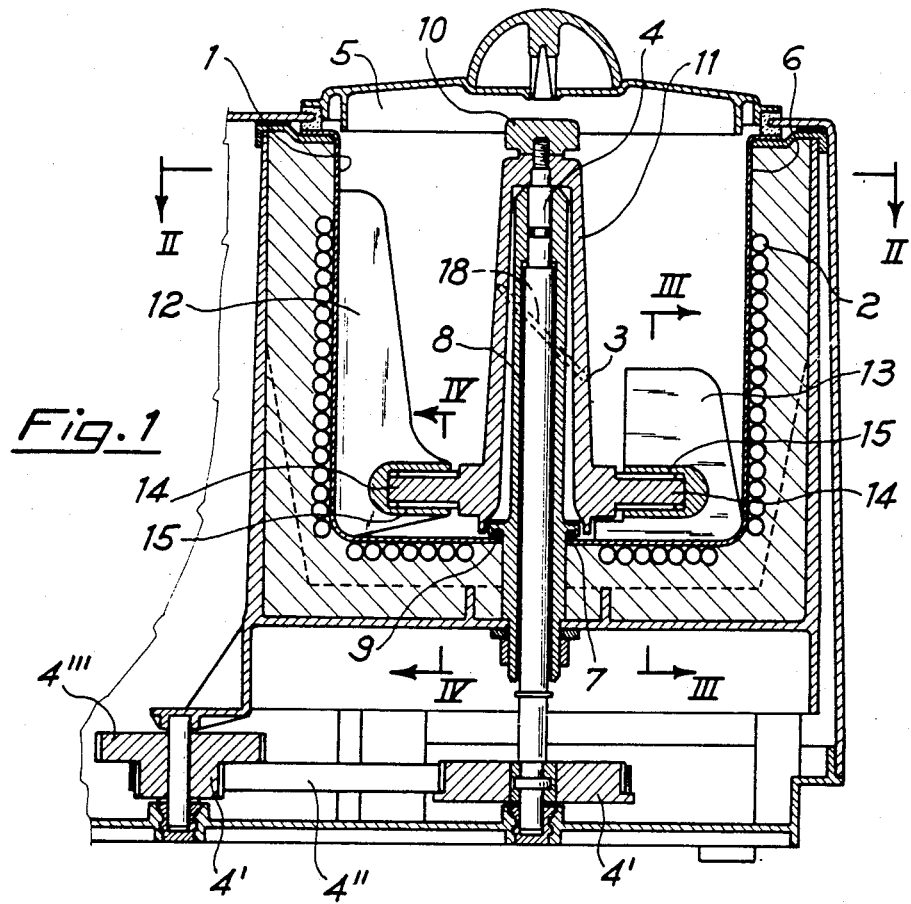
Fig.1
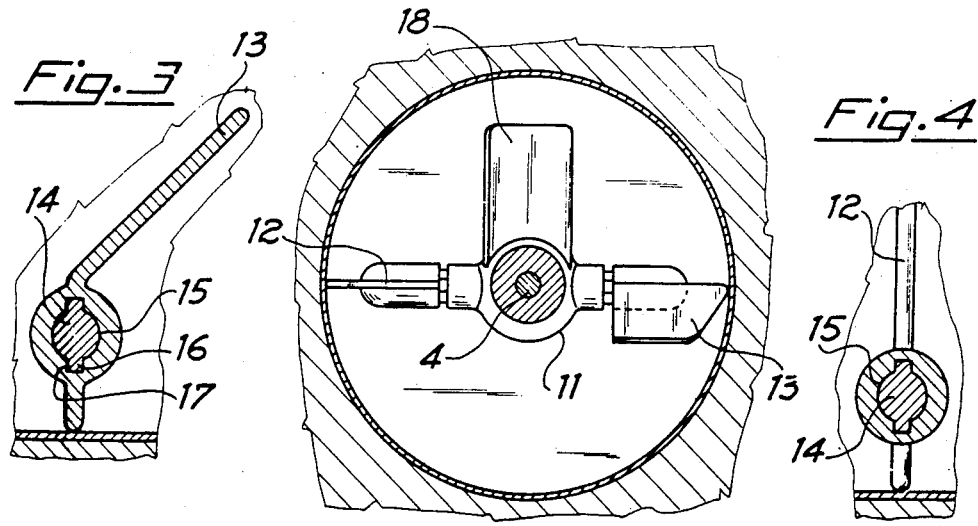
Fig.2
Fig.3
Fig.4

ICE-CREAM MACHINE

BACKGROUND OF THE INVENTION

1. Field of the Invention

This invention relates to an ice-cream machine of a limited capacity, in particular as suitable for the needs of a family, a small community and the like, which will be called "ice-cream machine for family use".

More in detail, this invention relates to an ice-cream machine for family use having a greater usefulness and operating efficiency in comparison with the ice-cream machines for family use known up to now.

2. Description of the Prior Art

Ice-cream machines of reduced capacity, suitable for the preparation of an ice-cream quantity ranging between 1 and 2 kilos and therefore suitable for the needs of a family, a small community and the like, are already known. Said ice-cream machines generally comprise a cylindrical whipping vessel with vertical axis, the walls of which are in conditions of thermal exchange with the evaporator of a refrigerating circuit built in the ice-cream machine itself. Inside the whipping vessel there is provided a stirrer for the mass to be freezed, which is rotated by a shaft coaxial to the vessel itself and actuated by an electric motor, which is comprised in the ice-cream machine as well. The function of the stirrer is to mix the mass to be freezed and to put it in contact with the cooled walls of the whipping vessel so that the desired thermal exchange takes place.

One of the reasons for the commercial success of said small ice-cream machines is due to their limited size and their low cost.

These two characteristics, however, involve the use of motors with reduced power and consequently the ice-cream machine performances are strictly dependent upon the presence of optimal conditions of cold transmission between the mass to be freezed and the whipping vessel walls as well as of optimal stirring conditions.

In others words, the quantity and time of ice-cream formation may undergo decay and considerable delay, respectively, if during the ice-cream machine operation, conditions different from the optimal ones occur. For example the formation of ice scales on the vessel walls interfers with the stirrer blades and tends to slow down and sometimes even to block the stirrer rotation. Moreover, the mass to be freezed often tends to accumulate in the bottom area of the whipping vessel and in this case cold transmission is strongly limited, in that the top section of the vertical wall of the whipping vessel is not interested by the mass to be freezed.

SUMMARY OF THE INVENTION

An object of the present invention is to provide an ice-cream machine which allows to overcome said drawbacks. Said object is achieved by an ice-cream machine for family use, of the type comprising a whipping vessel which houses a stirrer for the mixture to be freezed, actuated by a shaft coaxial to the vessel, the stirrer comprising a sleeve, which is coaxial and dynamically connected to said haft, and one or more whipping blades, characterized in that at least one of the stirrer blades is mounted on the sleeve by means of a removable coupling allowing small axial and torsional movements of the blade with respect to an axis essentially perpendicular to the sleeve axis. Advantageously, said removable coupling consists of a pivot radially protruding from the sleeve and of a corresponding bore provided in the blade; the pivot present longitudinal reliefs capable of matching corresponding grooves provided in the blade bore to limit the relevant rotations.

The ice-cream machine stirrer according to the invention also comprises two removable blades made of plastic material and a fixed blade integral to the sleeve, one removable blade and the fixed one being sloping in respect to the vessel axis according to an angle oriented in the stirrer rotation direction, and being placed one behind the other and in a way that the lower edge of the fixed blade is substantially at the height of the upper edge of the removable blade.

An advantage of the ice-cream machine according to the present invention is to have a stirring member which allows to obtain high quality ice-cream independently from the presence of ice scales on the whipping vessel walls. Moreover, the particular configuration of the stirrer blades, by distributing the mass to be freezed on the whole internal surface of the whipping vessel, assures a complete cold transmission with subsequent reduction of the time necessary for ice-cream preparation. Furthermore, the fact that the stirrer blades are removable facilitates cleaning of the stirrer itself, besides making it possible to substitute the blades in case they are worn out and in presence of different needs of the mixture.

BRIEF DESCRIPTION OF THE DRAWINGS

In the accompanying drawings:

FIG. 1 is a vertical cross-sectional view of the whipping vessel of an ice-cream machine;

FIG. 2 is a cross-sectional view of the whipping vessel, according to arrow II—II of FIG. 1;

FIG. 3 is a cross-sectional view of a stirrer blade according to arrow III—III of FIG. 1;

FIG. 4 is a cross-sectional view of another stirrer blade according to arrow IV—IV of FIG. 1.

DESCRIPTION OF THE PREFERRED EMBODIMENT

With reference to the figures, the ice-cream machine essentially comprises and in a way known in itself, a cylindrical whipping or mixing vessel 1 having a vertical axis, the walls of which are in conditions of thermal exchange with an evaporation coil 2 of a refrigerating circuit provided in the ice-cream machine itself. A stirrer 3 for the mass to be freezed is rotated by a shaft 4 coaxial to the vessel 1 and is connected, by means of pulleys 4', belt 4" and gears 4''', to an electric motor provided inside the ice-cream machine as well.

The mixing vessel 1 can be closed by means of a lid 5 and is built in an insulated space. The shaft 4 protrudes from a bore 7 provided on the vessel bottom and is housed in a fixed cylindrical liner 8 bearing an O-ring 9 which sealingly closes the bore 7. Coaxially to the shaft 4 and liner 8, the stirrer 3 can be inserted and can be fastened to the shaft 4 by means of a knob 10 which can be screwed onto the threaded upper end of the shaft itself. The stirrer 3 consists of a sleeve 11, the lower end of which can hold two blades 12 and 13 made of plastics material. The first blade 12 has the function of scraping the vertical walls of the mixing vessel, while the second blade 13 has the function of scraping the bottom of the mixing vessel and of conveying the freezed mass upwards; for this purpose the blade 13 is inclined in respect to the shaft 4 according to an angle oriented in the rotation direction of the stirrer.

The coupling of each blade with the sleeve is obtained by engaging a pivot 14 protruding in a radial direction from the sleeve base, into a corresponding bore 15 provided in the blade. The pivots 14 are provided with longitudinal reliefs 16 suitable for matching corresponding grooves 17 provided in the bores 15 of blades, so as to prevent relevant rotations between each pivot and the related blade. In particular, the clearance between the pivot 14 and bore 15, as necessary to allow an easy insertion of the pivot itself in to the bore allows a small rotation of the blade around the pivot axis. Moreover, the coupling between the blade and sleeve is such as to allow, when the stirrer is placed in the mixing vessel, small movements of the blade in axial and torsional directions with respect to the pivot axis. Said blade movements are essential for allowing the blade itself to overcome, without causing overloads in the control means of the stirrer rotations, eventual ice scales present on the inner walls of the mixing vessel. Finally, the particular configuration of the coupling endows the blade with a certain flexibility which allows it to warp and easily overcome ice scales.

Furthermore the sleeve 11 has a fixed blade 18 protruding in a radial direction from the sleeve itself and sloping in respect to the shaft 4 according to an angle oriented in the stirrer rotation direction. Said fixed blade is out of alignement by 90 in respect to the removable blade 13 and its lower edge is substantially at the height of the upper edge of blade 13. In this way, the freezed mass lifted by the blade 13 partly falls down into the space existing between the blade 13 and the fixed blade 18 and partly is collected by this latter blade 18, and again conveyer upwards. The action performed by the blades 13 and 18, therefore, allows to distribute the mass to be freezed on the whole extension of the vertical wall of the mixing vessel, in a way as to allow a complete cold transmission between the mixing vessel and the mass to be freezed. This characteristic is particularly advantageous in that it allows to take maximum advantage of the refrigerating circuit power and to reduce the time necessary for ice-cream preparation.

The possibility of removing the mixing blades has the advantage of extremely facilitating the removal and cleaning of the stirring element and allows to substitute the blades themselves when they are worn or in case of particular mixing needs.

I claim:

1. An ice-cream machine for family use, of the type comprising a whipping vessel inside which there is provided a stirring element for the mixture to be freezed, said stirring element being actuated by a shaft coaxial to the vessel and comprising a sleeve which is coaxially and dynamically connected to said shaft, as well as one or more mixing blades, wherein at least one blade of the stirrer is mounted by means of a removable coupling on the sleeve, said coupling pivotably connected as to allow small axial and torsional movements of the blade in respect to an axis essentially perpendicular to the sleeve axis.

2. An ice-cream machine according to claim 1, wherein said removable coupling is formed by a pivot radially protruding from the sleeve and a corresponding bore provided in the blade, said pivot having longitudinal reliefs capable of matching corresponding grooves provided in said blade bore, to limit relevant rotations.

3. An ice-cream machine according to claim 1, wherein said stirrer comprises two removable blades made of plastics material and a fixed blade integral to said sleeve, one removable blade and said fixed blade being sloping in respect to the vessel axis according to an angle oriented in the stirrer rotation direction and being placed one behind the other and in such a way that the lower edge of said fixed blade substantially lies at the height of the upper edge of said one removable blade.

* * * * *